United States Patent
Backé et al.

[11] Patent Number: 5,503,365
[45] Date of Patent: Apr. 2, 1996

[54] DIRECTLY CONTROLLED HYDRAULIC PRESSURE VALVE

[75] Inventors: Wolfgang Backé, Aachen; Christoph Latour, Geilenkirchen; Bernd Killing, Erkrath, all of Germany

[73] Assignee: Denison Hydraulik GmbH, Hilden, Germany

[21] Appl. No.: 477,880

[22] Filed: Jun. 7, 1995

[30] Foreign Application Priority Data

Feb. 15, 1995 [EP] European Pat. Off. ............ 95102077

[51] Int. Cl.⁶ .................................................. F16K 31/06
[52] U.S. Cl. ........................................ 251/129.07; 251/282
[58] Field of Search ........................ 251/129.07, 129.01, 251/282

[56] References Cited

U.S. PATENT DOCUMENTS

| | | | |
|---|---|---|---|
| 4,679,765 | 7/1987 | Kramer et al. | 251/282 X |
| 4,796,854 | 1/1989 | Ewing | 251/129.07 |
| 5,106,053 | 4/1992 | Miller et al. | 251/282 X |
| 5,163,654 | 11/1992 | Borsatti et al. | 251/129.07 X |

*Primary Examiner*—Martin P. Schwadron
*Assistant Examiner*—Kevin L. Lee
*Attorney, Agent, or Firm*—Friedrich Kueffner

[57] ABSTRACT

A directly controlled hydraulic pressure valve includes a valve housing and an outer valve sleeve which is placed in a port of the valve housing. The port is closed by a cover. A cylindrical inflow component is arranged in the interior of the valve sleeve. The inflow component has a first portion whose diameter is smaller than the internal diameter of the valve sleeve and a second portion having a greater diameter, wherein the outer valve sleeve rests with its end face against the second portion. The pressure valve further includes a cup-shaped tubular piston which is longitudinally movably arranged in an annular space between the valve sleeve and the inflow component, wherein the bottom of the tubular piston is located remote from the second portion. An annular groove is formed in the first portion of the inflow component. Axially extending inflow ducts are provided in the end face of the second portion of the inflow component. The inflow ducts connect the annular groove to an inflow bore in the valve housing. A deflection chamber is formed at the outer circumference of the first portion of the inflow component and adjacent the second portion, wherein the deflection chamber is in communication with outlet openings formed in the valve sleeve. The valve control edges are formed by an edge of the annular groove and an adjacent edge of the tubular piston. The valve further includes a device for exerting a force on the inflow component in a direction which is directed opposite the direction of the pressure force in the inflow bore.

6 Claims, 1 Drawing Sheet

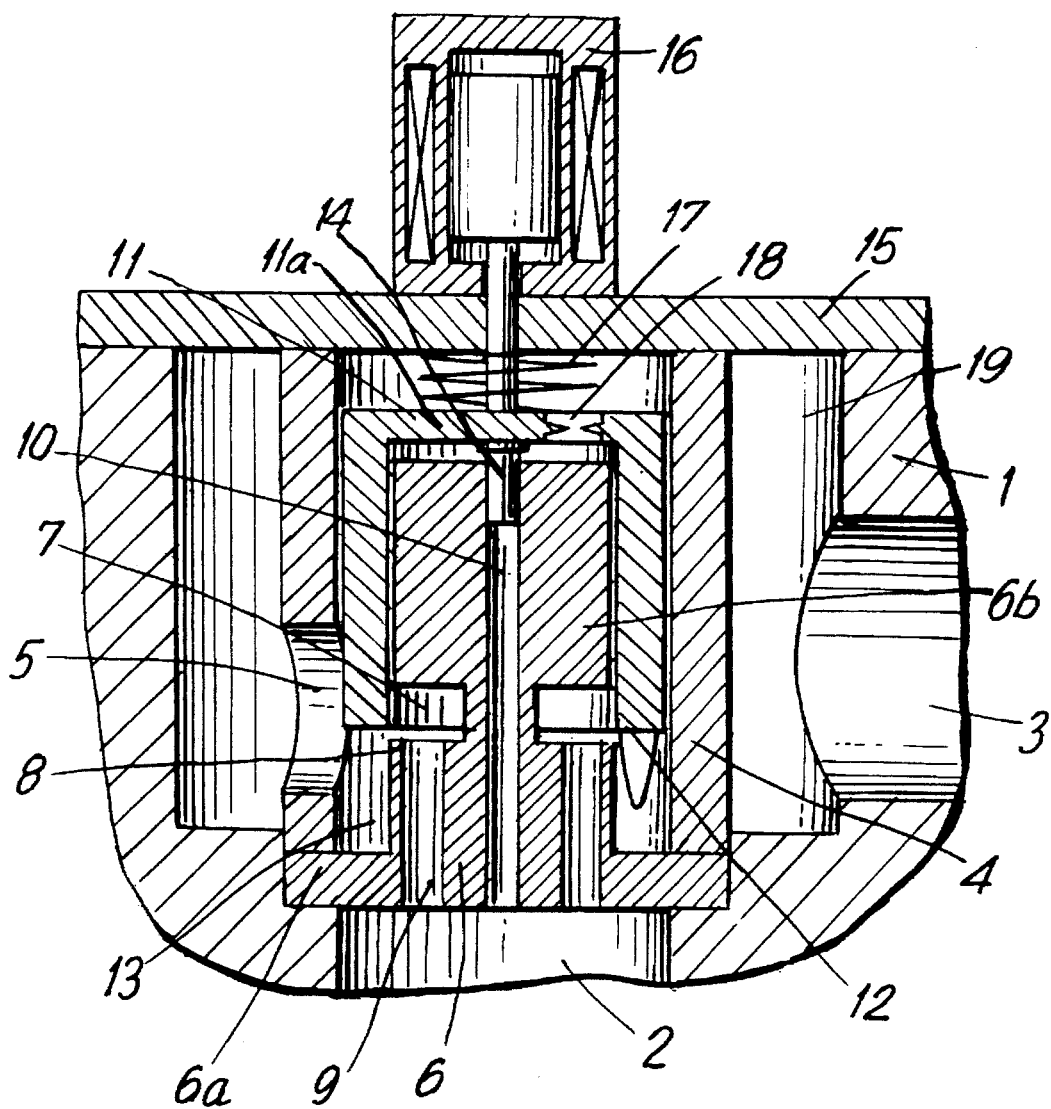

DIRECTLY CONTROLLED HYDRAULIC PRESSURE VALVE

BACKGROUND OF THE INVENTION

1. Field of the Invention

The present invention relates to a hydraulic pressure valve with direct control.

2. Description of the Related Art

Hydraulic pressure valves known in the past have several significant disadvantages with respect to their construction and operation. On the one hand, directly controlled pressure valves, such as conical seat valves with pretensioned spring or proportional magnet, are only suitable for low hydraulic powers because the valve cones are without pressure compensation and, thus, very high pressure forces occur in the case of larger cone diameters. In addition, forces of flow act on the valve cone which forces enter the force balance of the cone as disturbance variable and which consequently lead to substantial deviations. On the other hand, pilot-controlled pressure valves whose pilot step usually is a directly controlled pressure valve make it possible to control substantially greater hydraulic powers, however, these valves also have severe disadvantages. The forces acting on the main step piston produce deviations in the balanced pressure behavior in addition to the deviations of the pilot, so that the stationary pressure/flow characteristics usually have an increasing tendency. Moreover, the dynamics of the pilot-controlled valves depend on the pilot pressure, i.e., the valves have substantially reduced dynamics when the available pilot pressures are small. Additional disadvantages of the pilot-controlled valves are the fact that the valves are of complicated construction and difficult to manufacture and they are sensitive to contamination.

In order to able to construct a directly controlled pressure valve, it is necessary to minimize the disturbance forces acting on the valve-piston, particularly the flow forces, because these forces enter directly as a disturbance variable the force balance determining the pressure to be controlled.

Various measures for effecting the compensation of the flow forces in hydraulic valves are known from the literature in this field, for example, from the dissertation entitled "Strömungskraftkompensation in direktgesteuerten, elektrohydraulischen Stetigventilen" [Flow force compensation in directly controlled, electrohydraulic continuous valves], RWTH Aachen 1992, by H.-J. Feigel. However, these proposed measures are not capable of achieving a compensation of the forces over the entire work range which would be sufficient for the case of application of the pressure valves. In the records of the Eleventh Fluid-technological Colloquium in Aachen 1994, C. Latour proposes on pages 35–50 a hydraulic two-way cartridge element which is essentially of the same type as the valve according to the present invention. This known element is essentially composed of an outer valve sleeve arranged in a port, a cylindrical, axially fixed inflow component and a cup-shaped, longitudinally movable tubular piston. This cartridge element is based on the concept of having the acceleration and deflection of the flow occurring in front of the control edge and the resulting change of the static pressure not act on the moving valve element but on the axially fixed valve element. As a result, in the state in which the flow force is not compensated, only very low flow forces act on the tubular piston. These remaining low forces are compensated by a deflection of the open jet, wherein the pressure medium jet is divided behind the control edge of the valve. A portion of this jet flows off directly radially through the outlet openings provided in the valve sleeve. The remaining portion is conducted into the deflection chamber by the webs formed between the outlet openings, wherein the pressure medium jet is approximately spirally deflected in the deflection chamber and the jet subsequently leaves the chamber through the outlet openings. The deflection of the pressure medium jet in the deflection chamber acts at least partially on the cup-shaped tubular piston in a direction which tends to open the low resistance, so that, when the deflection chamber is of suitable configuration, no significant flow forces occur over a large work area. Another significant advantage of this flow resistance with cup-shaped tubular piston is the fact that the tubular piston is completely force-balanced in the closed state even without a pressure compensating bore.

SUMMARY OF THE INVENTION

Therefore, it is the primary object of the present invention to provide a directly controlled hydraulic pressure valve which can be used for higher hydraulic powers and has a very good balanced pressure behavior.

In accordance with the present invention, the directly controlled hydraulic pressure valve includes a valve housing and an outer valve sleeve which is placed in a port of the valve housing, wherein the port can be closed by means of a cover. A cylindrical inflow component is arranged in the interior of the valve housing. The inflow component has a first portion whose diameter is smaller than the internal diameter of the valve sleeve and a second portion having a greater diameter, wherein the outer valve sleeve rests with its end face against the second portion. The pressure valve further includes a cup-shaped tubular piston which is longitudinally movably arranged in an annular space between the valve sleeve and the inflow component, wherein the bottom of the tubular piston is located remote from the second portion having the greater diameter. An annular groove is formed in the first portion of the inflow component having the smaller diameter. Axially extending inflow ducts are provided in the end face of the second portion of the inflow component having the greater diameter. The inflow ducts connect the annular groove to an inflow bore in the valve housing. A deflection chamber is formed at the outer circumference of the first portion of the inflow component having the smaller diameter and adjacent the second portion having the greater diameter, wherein the deflection chamber is in communication with outlet openings formed in the valve sleeve. The valve control edges are formed by an edge of the annular groove and an adjacent edge of the tubular piston. The valve further includes a device for exerting a force on the inflow component in a direction which is directed opposite the direction of the pressure force in the inflow bore.

The pressure valve according to the present invention forms a flow resistance which is pressure balanced and completely compensated with respect to the forces of flow.

The tubular piston is accelerated by the difference between the pressure in the inflow bore acting in opening direction and the force of the device for exerting a force on the inflow component which acts in closing direction, wherein the tubular piston is accelerated until a force equilibrium is reached, so that excess volumetric flow of the system can be discharged over the valve control edge. Compared to the known directly controlled pressure valves, the use of a flow resistance which is completely pressure balanced and compensated with respect to flow force according to the present invention makes it possible to directly control much higher hydraulic powers. Depending on the type of valve, the valve can be equipped with pressure limiting operation, ram pressure operation or pressure reducing operation.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a partial sectional view of a directly controlled hydraulic pressure valve according to the present invention.

DETAILED DESCRIPTION OF THE PREFERRED EMBODIMENTS

As illustrated in the drawing, a port 19 is formed in a valve housing 1. The actual valve, also called cartridge element, can be placed in the port 19. An inflow bore 2 is provided in the valve housing, wherein the flow medium pressure to be limited is present in the inflow bore 2. A flow-off bore 3 of the valve housing 1 is connected to a return line to a tank.

An outer valve sleeve 4 is mounted in the port 19. Outlet openings or bores 5 provided in the valve sleeve 4 make it possible that the flow medium jet flows off approximately radially into the port 19 of the valve housing 1.

An inflow component 6 is arranged in the cylindrical bore of the valve sleeve 4. The inflow component 6 has a first portion 6b having a diameter which is smaller than the internal diameter of the valve sleeve 4 and a second portion 6a having a greater diameter. The outer valve sleeve 4 rests with its end face against the portion 6a having the greater diameter. A circumferential annular groove 7 is formed in the portion 6b of the inflow component 6 having the smaller diameter. Together with the adjacent edge 12 of a tubular piston 11, the annular groove edge 8 of the annular groove 7 forms the control edge pair of the pressure valve. The tubular piston 11 surrounds the first portion 6a of the inflow component 6.

Inflow ducts 9 are formed in the end face of the portion 6a of the inflow component 6 having the greater diameter. The inflow ducts 9 form a connection between the inflow bore 2 and the annular groove of the inflow component 6. A throughbore 10 extending on the axis of symmetry is provided in the inflow component 6.

The tubular piston 11 is cup-shaped and is arranged between the outer valve sleeve 4 and the cylindrical inflow component 6 in an appropriately dimensioned annular space. The tubular piston 11 is axially movable, so that an axial displacement of the tubular piston 11 blocks or releases a portion of the circumferential annular groove 7 provided in the cylindrical inflow component 6.

For effecting a flow force compensation, a portion of the flow medium jet is caused to carry out a spirally shaped movement in a deflection chamber 13 in order to produce an upwardly directed compensating force.

A push rod 14 is placed in the throughbore 10 of the inflow component 6. This push rod 14 exerts a pressure-proportional force on the bottom 11a of the cup-shaped tubular piston 11 in a direction which opens the flow resistance. A cover 15 closes the port 19.

A device 16 produces a force which is directed opposite the force of push rod 14 which forms a pressure sensing element. The device 16 may be, for example, a pretensioned spring with mechanical adjustment or also a proportional magnet.

When no pressure is applied, a spring 17 closes the flow resistance to be in closing position. A damping aperture 18 in the piston 11 determines the damping properties of the pressure valve.

The flow medium flowing from the inflow bore 2 through the inflow ducts 9 and the annular groove 7 over the pair of control edges 8, 12 into the deflection chamber 13 is divided in the deflection chamber 13, so that a portion of the pressure medium jet flows off directly through the outlet openings 5 of the valve sleeve 4 approximately radially into the port 19 of the valve housing 1, while the other portion flows against the webs remaining between the outlet openings 5 and is approximately spirally deflected in the deflection chamber 13, so that a force component is produced which opens or compensates the flow resistance before this partial jet also leaves the deflection chamber 13 through the outlet openings 5.

If pressurized oil is present in the inflow bore 2 of the valve housing 1, the pressure propagates through the throughbore 10 of the inflow component 6, so that an axially upwardly directed, pressure-proportional force is exerted on the push rod 14. This force is transmitted through the upper end face of the push rod 14 to the cup-shaped tubular piston 11 and acts in a direction which tends to open the flow resistance. This upwardly directed pressure-proportional force is counteracted by a downwardly acting outer force of the device 16 for producing a force. The force resulting from the force balance accelerates the cup-shaped tubular piston 11 until a force equilibrium is reached. For example, if the force of the push rod 14 is greater than the outer downwardly directed force of the device 16 for producing a force, the tubular piston 11 is moved upwardly until a force equilibrium is reached between the pressure of the push rod 14 and the external force. As this occurs, a partial cross section of the annular groove 7 of the inflow component 6 is released and a flow through the valve starts which is directed from the inside toward the outside. Consequently, the excess volumetric flow of the system is discharged to the tank. When the system pressure to be controlled is lowered in the inflow bore 2, the tubular piston 11 is moved in closing direction until a force equilibrium is reached between the pressure-proportional force of the push rod 14 and the external force.

The invention is not limited by the embodiments described above which are presented as examples only but can be modified in various ways within the scope of protection defined by the appended patent claims.

We claim:

1. A directly controlled hydraulic pressure valve comprising a valve housing having a port and an outer valve sleeve having an interior and an internal diameter, the valve sleeve being mounted in the port of the valve housing, a cover for closing the port, a cylindrical inflow component being mounted in the interior of the valve sleeve, the inflow component having a first portion whose diameter is smaller than the internal diameter of the valve sleeve and a second portion having a diameter greater than the diameter of the first portion, wherein the outer valve sleeve rests with an end face thereof against the second portion, a cup-shaped tubular piston having a bottom being longitudinally movably arranged in an annular space defined between the valve sleeve and the inflow component, wherein the bottom of the tubular piston is located remote from the second portion, an annular groove being formed in the first portion of the inflow component, axially extending inflow ducts being provided in an end face of the second portion of the inflow component for connecting the annular groove to an inflow bore in the valve housing, a deflection chamber being defined at an outer circumference of the first portion of the inflow component and adjacent the second portion, wherein the deflection chamber is in communication with outlet openings formed in the valve sleeve, valve control edges being formed by an edge of the annular groove and an adjacent edge of the tubular piston, further comprising a device for exerting a force on the inflow component in a direction which is directed opposite the direction of a pressure force in the inflow bore.

2. The pressure valve according to claim 1, wherein the inflow component has an axis, the inflow component having a throughbore extending coaxially with the axis of the inflow component, a push rod displaceably mounted in the throughbore, the push rod having an end face located outside of the throughbore, wherein the end face of the push rod rests against the bottom of the cup-shaped tubular piston.

3. The pressure valve according to claim 1, wherein the bottom of the cup-shaped tubular piston has a damping aperture.

4. The pressure valve according claim 1, comprising a spring acting in a closing direction provided between the bottom of the cup-shaped hollow piston and an inner surface of the cover.

5. The pressure valve according to claim 1, wherein the device for exerting a force on the inflow component is a pretensioned spring with mechanical adjustment.

6. The pressure valve according to claim 1, wherein the device for exerting a force on the inflow component is an electromagnet.

* * * * *